E. SCHWARTZ.
COFFEE GRAIN SERVING CANISTER.
APPLICATION FILED MAY 16, 1911.
1,011,859.
Patented Dec. 12, 1911.
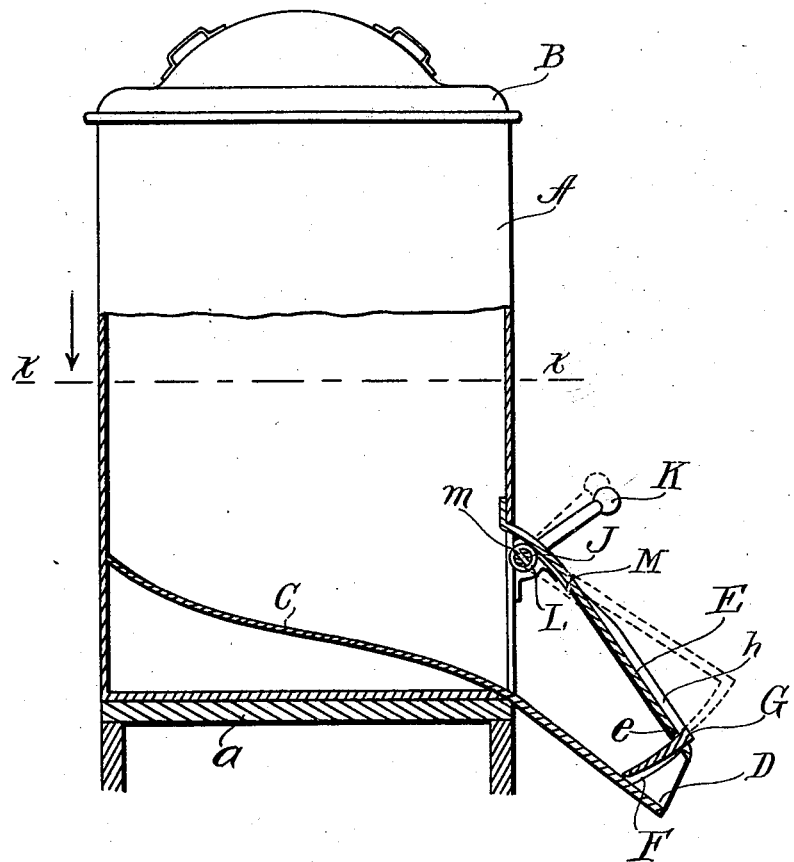
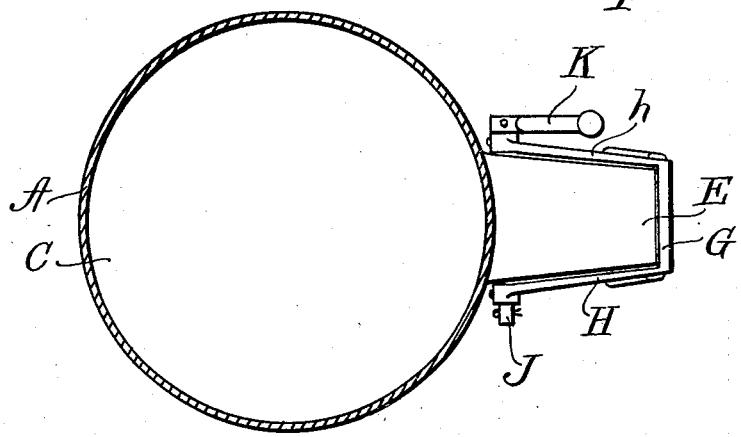
Witnesses
R. C. Balinger.
O. Torrens.
Inventor
Elek Schwartz.
By Edwin Guthrie.
Attorney

UNITED STATES PATENT OFFICE.

ELEK SCHWARTZ, OF NEW YORK, N. Y.

COFFEE-GRAIN-SERVING CANISTER.

1,011,859.   Specification of Letters Patent.   Patented Dec. 12, 1911.

Application filed May 16, 1911. Serial No. 627,545.

*To all whom it may concern:*

Be it known that I, ELEK SCHWARTZ, a citizen of the United States, residing at New York, in the county of New York and State of New York, have invented certain new and useful Improvements in Coffee-Grain-Serving Canisters, of which the following is a specification.

This invention relates to coffee grain serving canisters, more particularly to those dispensing receptacles for the purpose, that are mostly made with spouts constructed and arranged to direct the contents of the receptacle conveniently into a paper bag held below the spout, without the necessity for the hands of the person operating the device coming into contact with the coffee. It is advantageous also to have the spout provided with a suitable closure, in order that the contents of the receptacle may not be exposed to the air further than is necessary to the operation.

This invention comprises parts of special construction and particular arrangement with respect one to the other, whereby it is believed the serving of the grains may be easily and rapidly effected. The special construction and arrangement is set forth in the accompanying drawings, of which—

Figure 1 represents a side view of all the parts assembled. This figure is partly sectional in order to disclose certain interior parts. Fig. 2 is a horizontal section on line $x-x$ of Fig. 1.

In the drawings and description, the same letter is employed to designate the same part.

A body or cylinder A, has the removable top B, and an interior inclined bottom C, to direct the contents to the spout D.

The spout D has a covered top E, provided with a transverse slot $e$, and the sides of the spout D have upwardly-extending curved grooves, one of which designated by the letter F, is shown in Fig. 1. A closure blade G, having the shape of a narrow, curved wedge, enters the slot $e$, and occupies the curved grooves in the sides of the spout. The closure blade G has, usually formed integrally with it, the side arms H and $h$, best illustrated in Fig. 2, and those arms are secured to the transverse shaft J, arranged above the spout near the body A, as shown. A handle K of any desired shape is introduced to operate the closure G. The closure G is, as a rule, provided with the coil return spring L, one end M of which lies against the inside of the top E of the spout, and the other end $m$ passes through the shaft J. The closure is, therefore, raised against the force of the spring, and will be returned by the spring when the raising effort ceases. The peculiar form and arrangement of the blade closure and spout D, completely shuts out the air and effectively preserves the aroma of the coffee grains.

Having now described this invention, and explained its mode of operation, what I claim is:—

1. In a serving canister, the combination with a hollow body, of a spout having a closed top provided with a transverse slot, a blade closure pivotally supported exteriorly with respect to the spout and arranged to enter the said slot, the said blade being wedge-shape and the upper portion of the blade being constructed of such thickness as to close the said slot in the top of the spout, and devices located adjacent to the spout and upon the outside thereof whereby said blade may be raised and lowered by hand.

2. In a serving canister, the combination with a hollow body, of a spout having a closed top provided with a transverse slot, a blade closure provided with side arms pivotally attached to the said hollow body exteriorly with respect to the spout, the said blade being arranged to enter the said slot and close the spout, the said blade being wedge-shape and the upper portion of the blade being constructed of such thickness as to close the said slot in the top of the spout, and devices located adjacent to the spout and upon the outside thereof whereby said blade may be raised and lowered by hand.

In testimony whereof I affix my signature in presence of two witnesses.

ELEK SCHWARTZ.

Witnesses:
DAVID FRIEDMAN,
EUGEN GEIRLE.

Copies of this patent may be obtained for five cents each, by addressing the "Commissioner of Patents. Washington, D. C."